(12) United States Patent
McCue

(10) Patent No.: US 8,819,863 B2
(45) Date of Patent: Sep. 2, 2014

(54) STABILIZER APPARATUS AND METHOD

(76) Inventor: Geoff McCue, Lawrence, KS (US)

( * ) Notice: Subject to any disclaimer, the term of this patent is extended or adjusted under 35 U.S.C. 154(b) by 166 days.

(21) Appl. No.: 13/284,616

(22) Filed: Oct. 28, 2011

(65) Prior Publication Data

US 2013/0104277 A1 May 2, 2013

(51) Int. Cl.
*A41D 13/00* (2006.01)

(52) U.S. Cl.
USPC .................................................. 2/69

(58) Field of Classification Search
CPC .... A43B 3/005; A43B 13/181; A43B 13/187; A43B 5/06; A43B 1/0054
USPC ................. 2/69, 455, 456; 600/595, 335, 485
See application file for complete search history.

(56) References Cited

U.S. PATENT DOCUMENTS

| | | | |
|---|---|---|---|
| 5,918,502 A * | 7/1999 | Bishop | 73/172 |
| 7,017,195 B2 * | 3/2006 | Buckman et al. | 2/455 |
| 7,150,048 B2 * | 12/2006 | Buckman | 2/465 |
| 7,188,439 B2 * | 3/2007 | DiBenedetto et al. | 36/132 |
| 7,225,565 B2 * | 6/2007 | DiBenedetto et al. | 36/132 |
| 7,310,895 B2 * | 12/2007 | Whittlesey et al. | 36/137 |
| 7,506,460 B2 * | 3/2009 | DiBenedetto et al. | 36/132 |
| 7,548,168 B2 * | 6/2009 | Ishikawa et al. | 340/573.1 |
| 7,631,382 B2 * | 12/2009 | DiBenedetto et al. | 12/142 P |
| 7,676,960 B2 * | 3/2010 | DiBenedetto et al. | 36/132 |
| 7,676,961 B2 * | 3/2010 | DiBenedetto et al. | 36/132 |
| 8,056,268 B2 * | 11/2011 | DiBenedetto et al. | 36/132 |
| 8,234,798 B2 * | 8/2012 | DiBenedetto et al. | 36/132 |
| 2007/0006489 A1 * | 1/2007 | Case et al. | 36/132 |
| 2007/0107778 A1 * | 5/2007 | Bettin et al. | 137/13 |
| 2009/0112134 A1 * | 4/2009 | Avni | 601/15 |
| 2010/0004567 A1 * | 1/2010 | Ishikawa et al. | 600/595 |

* cited by examiner

*Primary Examiner* — Khoa Huynh
*Assistant Examiner* — Anna Kinsaul
(74) *Attorney, Agent, or Firm* — Polsinelli PC; Adam C. Rehm

(57) ABSTRACT

Disclosed is an apparatus for stabilizing user's body parts. The apparatus is capable of being attached to a wearable article to be worn by the user. The apparatus includes an electrical arrangement and a protective covering arrangement. The electrical arrangement is capable of detecting one or more variables acting on the user's body parts, and responding in a manner to stabilize the user's body parts. Further, the protective covering arrangement is arranged to encapsulate the electrical arrangement therein. Furthermore, a method for making the apparatus and wearable articles made there from are also disclosed.

17 Claims, 8 Drawing Sheets

STABILIZER APPARATUS AND METHOD

FIELD OF THE DISCLOSURE

The present general inventive concept relates to wellness accessories, and, more particularly, to a stabilizer apparatus and method to stabilize a user's body part against any variables acting on the body part while the body part is in motion, for instance, while the user is performing physical activities, such as playing sports, or being rehabilitated, such as in orthopedic medicine.

BACKGROUND OF THE DISCLOSURE

Sports or physical activities, such as tennis, golf, football, handball, baseball, cycling and running, maintain or improve physical fitness of players and are also a source of entertainment for them. However, performing sports or physical activities may be risky for the body or body parts of the players, especially when proper precautions are neglected by players. For example, while performing such sports or physical activities, the players may feel prolonged vibrations or pressure on their body or body parts that are in direct contact with sports articles or with ground.

Specifically, while playing tennis, golf, handball or baseball, players may be likely to feel vibrations or pressure on and round their hands as they are required to continuously hit balls. Similarly, while playing football and doing cycling, players may feel continuous vibrations and pressure on and around their legs. If proper precautions are neglected by the players, the vibrations or pressure may possibly reduce blood flow, and accordingly may incapacitate the functioning of their body parts.

Many efforts have been made to obviate such problems. One such effort includes, introducing a vibration damping element in the sport article used by the player. An example of such solution is evident in U.S. Pat. No. 7,160,286 ('286 patent), which is incorporated herein by reference in its entirety. In the '286 patent, a sports article, such as a tennis racket, is provided having a vibration damping element disposed therein. Although, such tennis racket may be effective in its intended purpose, but, it is found to be limited in its scope of damping vibrations acting on players involved in playing tennis. Further, such tennis racket is not adaptable to dampen the vibrations acting on players involved in playing other sports or performing other physical activities. Furthermore, the tennis racket described in the '286 patent may be suitable only for damping vibration around the hands of the players, and is ineffective for damping vibrations in the other body parts, such as legs or neck, where players have been found to encounter substantial vibrations and pressure.

Furthermore, the application of tennis racket disclosed in the '286 patent, or any other sport utensils as known in the art, may be limited only to damping the vibrations. It will be appreciated by the persons skilled in the art that while playing games or performing any other sport activity, the players may many times need external pressure to be applied on their body parts for improving blood flow in those body parts. In such scenario, know prior art sports utensils have proven to be ineffective.

Moreover, apart from sports or any other physical activities, there may be other activities in which an individual body or body parts are required to be stabilized by reducing, increasing or maintaining various variables, such as pressure, vibrations etc. acting thereon. Suitable examples of such activities may include sports medication, rehabilitation of the body or its parts, and orthopedics.

Accordingly, there exists a need for stabilizing human body or its part against vibration, pressure, or any other variable acting on the body during sports or any other physical activities.

SUMMARY OF THE DISCLOSURE

In view of the forgoing disadvantages inherent in the prior art, the general purpose of the present general inventive concept is to provide an apparatus for stabilizing one or more body parts of a user that is configured to include all advantages of the prior art, and to overcome the drawbacks inherent in the prior art.

An object of the present general inventive concept is to provide an apparatus for stabilizing user's body parts against any variables acting on the body of the user during performance of sports or physical activities, or during sports medication, rehabilitation or in orthopedics.

Another object of the present general inventive concept is to provide an apparatus that may be attached with any wearable article so that the user may wear the apparatus on any desired body part for stabilizing the body part. Another object of the present general inventive concept is to provide wearable articles including the apparatus. Another object of the present general inventive concept is to provide a method of making the apparatus mentioned above.

To achieve the aforementioned objects and advantages, the present general inventive concept provides in an aspect thereof, an apparatus for stabilizing user's body parts is provided. The apparatus is capable of being attached to a wearable article to be worn by the user. The apparatus includes an electrical arrangement and a protective covering arrangement. The electrical arrangement is capable of detecting one or more variables acting on the user's body parts, and responding in a manner to stabilize the user's body parts. Further, the protective covering arrangement is arranged to encapsulate the electrical arrangement therein.

In another aspect of the present general inventive concept, a method for making the apparatus for stabilizing the user's body parts is provided. The apparatus is capable of being attached to the wearable article to be worn by the user, the method includes configuring an electrical arrangement capable of detecting one or more variables acting on the user's body parts and capable of responding in a manner adapted to stabilize the user's body parts. The method further includes encapsulating the electrical arrangement in a protective covering arrangement.

In another aspect of the present general inventive concept, a wearable article is provided. The wearable article is adapted to be worn by the user for stabilizing the body parts thereof. The wearable article includes an electrical arrangement, a protective covering arrangement, and a fastening member. The electrical arrangement is capable of detecting one or more variables acting on a user's body parts and is capable of responding in a manner to stabilize the user's body parts. Further, the protective covering arrangement is arranged to encapsulate the electrical arrangement. Furthermore, the fastening member is adapted to be secured to the protective covering arrangement for fastening the apparatus to the user's body parts.

In another aspect of the present general inventive concept, an apparatus for stabilizing a body part of a user is provided. The apparatus may be capable of being attached to a wearable article to be worn by the user anywhere on a body of the user. For example, the apparatus may be configured as a brace, a wrap, and/or a shoe or the like and may cover layers with space and/or layers without space. The apparatus may include an electrical arrangement capable of detecting at least one variable acting on a body part, and responding in a manner to stabilize the body part. The apparatus may further include at least one piezoelectric sensor to detect the at least one variable and generate a signal based on the detection of the at least one variable. The apparatus may further include at least one microprocessor coupled to the piezoelectric sensor and operable to receive the signal generated by the at least one piezoelectric sensor and process the signal. The apparatus may further include at least one piezoelectric actuator coupled to the microprocessor and operable to receive the signal processed by the at least one microprocessor and actuate for stabilizing the body part. The apparatus may further include at least one power source arrangement coupled to the microprocessor and the piezoelectric actuator, and operable to electrically charge the microprocessor and/or the piezoelectric actuator. The electrical arrangement may be substantially externally powered by an external power source. The at least one power source arrangement may include at least one battery and at least one capacitor.

The apparatus may further include at least one piezoelectric sensor operable to detect one or more variables and generate a signal based on the detection of the one or more variables. The apparatus may further include at least one microprocessor coupled to the piezoelectric sensor and operable to receive the signal generated by the at least one piezoelectric sensor and process the signal. The apparatus may further include at least one piezoelectric actuator operable to be actuated by at least one of the piezoelectric sensor or the processed signal received by the microprocessor for stabilizing the body part. The electrical arrangement may be substantially self powered. The electrical arrangement may include at least one capacitor operable to be charged by the signal.

The electrical arrangement may include at least one transducer, at least one accelerometer, and/or at least one microprocessor electrically, which are coupled to each other and operable to detect the at least one variable acting on the body part, and generate a response to stabilize the body part. The electrical arrangement may include at least one power source. The electrical arrangement may be operable to stabilize the body part by one or more of reducing, increasing, and/or maintaining an effect or effects of the at least one variable on the body part.

The apparatus may further include a protective covering arrangement operable to encapsulate the electrical arrangement therein. The protective covering may include at least two substantially flexible linings spaced apart by at least one spacer member that defines a space operable to encapsulate the electrical arrangement. The apparatus may further include a protective covering arrangement including at least two substantially flexible linings operable to encapsulate the electrical arrangement.

In another aspect of the present general inventive concept, a method of stabilizing a body part of a user via an apparatus capable of being attached to a wearable article to be worn by the user is provided. The method includes the steps of configuring an electrical arrangement operable to detect at least one variable acting on the body part, and/or generating a response operable to stabilize the body part upon detection of the at least one variable. The step of configuring the electrical arrangement may include configuring at least one piezoelectric sensor, at least one microprocessor, and at least one piezoelectric actuator. The step of configuring the electrical arrangement may include configuring at least one power source arrangement. The step of configuring the electrical arrangement may include configuring at least one capacitor. The step of configuring the electrical arrangement may include electrically coupling at least one transducer, at least one accelerometer, at least one microprocessor, and at least one power source to each other to detect the at least one variable acting on the body part, and to generate a response operable to stabilize the body part.

The method may further include the step of disposing the electrical arrangement between at least two substantially flexible linings spaced apart by at least one spacer member arranged to substantially encapsulate the electrical arrangement.

In another aspect of the present general inventive concept, a wearable article to be worn by a user for stabilizing a body part of the user is provided. The wearable article may include an electrical arrangement operable to detect at least one variable acting on a body part and generate a response operable to stabilize the body part, a protective covering substantially encapsulating the electrical arrangement, and/or a fastening member secured to the protective covering. The fastening member may be operable to fasten the wearable article on the body part. The fastening member may be operable to be fastened to another wearable article.

These together with the other aspects of the present general inventive concept, along with the various features of novelty that characterized the present general inventive concept, are pointed out with particularity in the claims annexed hereto and form a part of the present general inventive concept. For a better understanding of the present general inventive concept, its operating advantages, and the specified object attained by its uses, reference should be made to the accompanying drawings and descriptive matter in which there are illustrated exemplary embodiments of the present general inventive concept.

BRIEF DESCRIPTION OF THE DRAWINGS

The advantages and features of the present general inventive concept will become better understood with reference to the following detailed description and claims taken in conjunction with the accompanying drawing, wherein like elements are identified with like symbols, and in which:

Like reference numerals refer to like parts throughout the description of several views of the drawings.

DETAILED DESCRIPTION OF THE DISCLOSURE

For a thorough understanding of the present general inventive concept, reference is to be made to the following detailed description, including the appended claims, in connection with the above-described drawings. Although the present general inventive concept is described in connection with exemplary embodiments, the present general inventive concept is not intended to be limited to the specific forms set forth herein. It is understood that various omissions and substitutions of equivalents are contemplated as circumstances may suggest or render expedient, but these are intended to cover the application or implementation without departing from the spirit or scope of the claims of the present general inventive concept. Also, it is to be understood that the phraseology and terminology used herein is for the purpose of description and should not be regarded as limiting.

The term "inner," "outer," and the like, herein do not denote any order, elevation or importance, but rather are used to distinguish placement of one element over another.

The terms "a" and "an" herein do not denote a limitation of quantity, but rather denote the presence of at least one of the referenced item.

Referring now to FIGS. 1A to 2B, wherein, perspective and side views of an apparatus 100 for stabilizing user's body parts are illustrated, in accordance with two exemplary embodiments of the present general inventive concept.

As shown in FIGS. 1A to 2B, the apparatus 100 includes an electrical arrangement 200 and a protective covering arrangement 300 (hereinafter referred to as 'covering arrangement 300'). The electrical arrangement 200 is capable of detecting one or more variables, such as vibrations, pressure, impact etc., acting on the user's body parts, and responding in a manner to stabilize the user's body parts, for instance, by reducing, increasing, and/or maintaining an effect of the at least one or more variables on the body part. The covering arrangement 300 is arranged to at least partially and preferably entirely encapsulate the electrical arrangement 200 to protect the electrical arrangement 200 from any damage by any external element or environment.

Figure 1B:
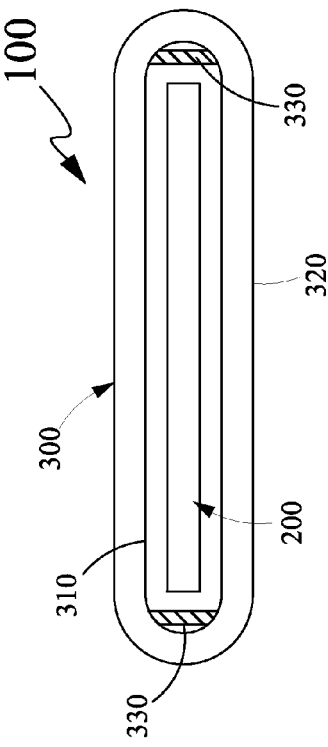
FIGS. 1A and 1B, respectively, illustrate perspective and side views of an apparatus for stabilizing user's body parts, in accordance with first exemplary embodiment of the present general inventive concept.
Figure 1A:
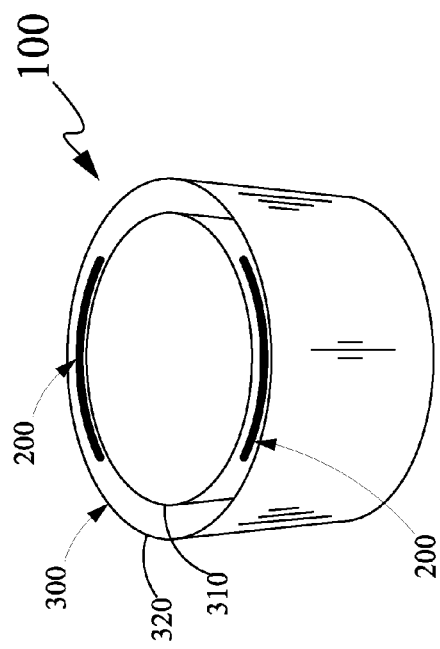

In one embodiment, as shown in FIGS. 1A and 1B, the covering arrangement 300 includes at least two substantially flexible linings, such as an inner lining 310 and an outer lining 320, for encapsulating at least two electrical arrangements 200 therewithin. However, without departing from the scope of the present general inventive concept, there may also be only one electrical arrangement 200 encapsulated between the inner and outer linings 310, 320 for configuring the apparatus 100.

The inner and outer linings 310, 320 as described herein may be made of semi-flexible materials that may be of a predetermined thickness. Usually, such thickness is provided which is enough to protectively mount the electrical arrangement 200 without hampering, in any way, the responsiveness of the electrical arrangement 200 to one or more variables. Further, the inner and outer linings 310, 320 may also be made durable and strong so as to protect the electrical arrangement 200 from external elements and environment.

Furthermore, the inner and outer linings 310, 320 may be of any shape and size as per requirements of the users. For example, as shown in FIGS. 1A and 1B, the inner and outer linings 310, 320 are of circular shape. Such circular shape the inner and outer linings 310, 320 may also have an elastic feature which may enable the user to directly wear the apparatus 100 on the desired body parts, such as wrist, to protect thereto from one or more variables. Also, the inner and outer linings 310, 320 of this embodiment may intimately encapsulate the electrical arrangement 200. However, without departing from the scope of the present general inventive concept, the inner and outer linings 310, 320 may encapsulate the electrical arrangements 200 in any other manner, such as, in a manner that provides a space between the inner and outer linings 310, 320 to encapsulate the electrical arrangements 200.

Figure 2B:
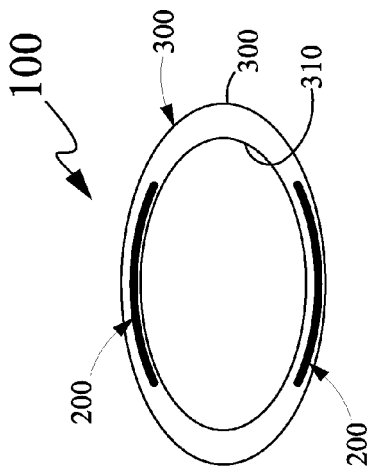
FIGS. 2A and 2B, respectively, illustrate perspective and side views of an apparatus for stabilizing user's body parts, in accordance with second exemplary embodiment of the present general inventive concept.
Figure 2A:
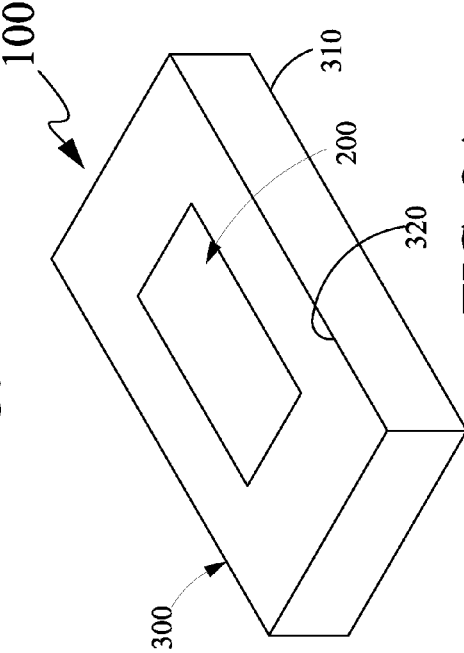

In another embodiment, as shown in FIGS. 2A and 2B, the covering arrangement 300 includes at least two substantially flexible linings, such as an inner lining 310 and an outer lining 320, for encapsulating the electrical arrangement 200 therewithin. The inner and outer linings 310, 320 are shown to configure a flat configuration of the apparatus 100. For example, the inner and outer linings 310, 320, shown in FIGS. 2A and 2B, are of flat rectangular or square shape. The inner and outer linings 310, 320 may include all the properties, durability, strong, flexibility etc., as mentioned with respect to the inner and outer linings 310, 320 in the description corresponding to FIGS. 2A and 2B. Such description is excluded herein for the sake of brevity.

The inner and outer linings 310, 320 of this embodiment may encapsulate the electrical arrangement 200 in a space there-between. For example, as shown in FIGS. 2A and 2B, the inner and outer linings 310, 320 are spaced apart by at least one spacer member, such as spacer members 330, for configuring the space there-between to encapsulate the electrical arrangement 200. However, without departing from the scope of the present general inventive concept, the inner and outer linings 310, 320 may encapsulate the electrical arrangement 200 in any other manner, such as, in a manner as the apparatus 100 of the first embodiment. The apparatus 100 of this second embodiment may be configured with any kind of attachment that may facilitate the user to wear the apparatus on body thereof. Such configuration and conceptions will be described herein later.

Figure 3A:
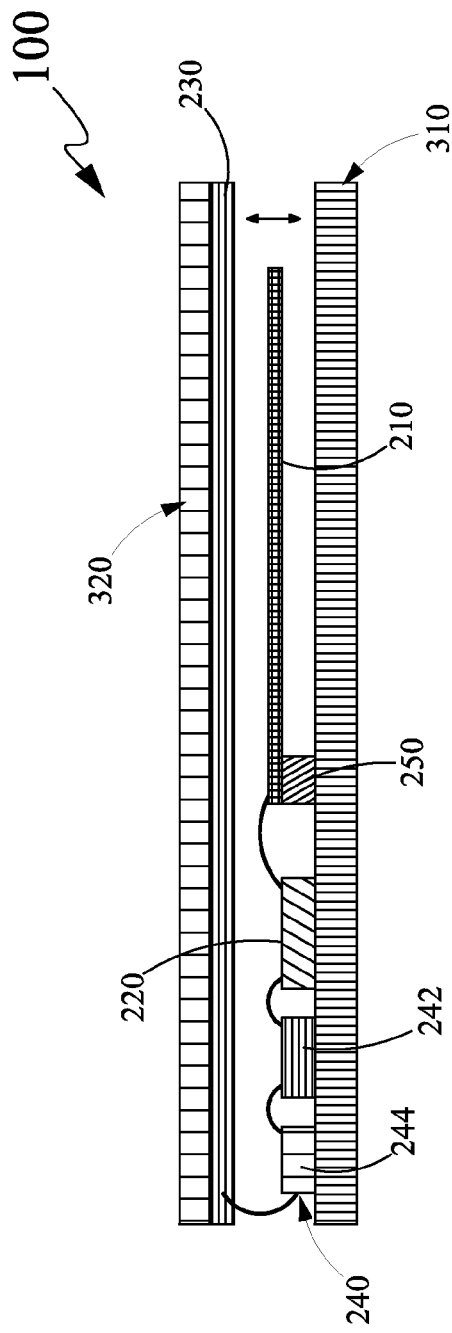
FIGS. 3A and 3B illustrate side views of the apparatus depicting electrical arrangements, in accordance with an exemplary embodiment of the present general inventive concept.
Figure 3B:
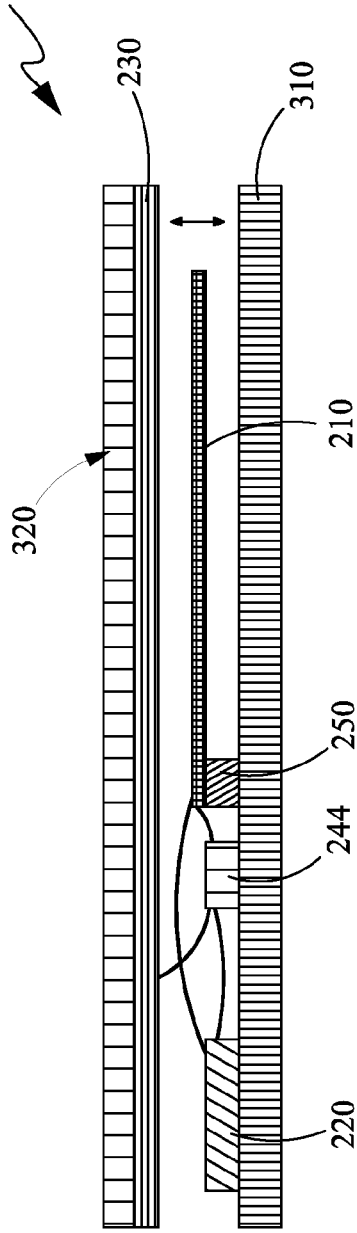

Referring now to FIGS. 3A and 3B, side and inner views of the apparatus 100 depicting the electrical arrangements 200 are illustrated, in accordance with an exemplary embodiment of the present general inventive concept. The electrical arrangement 200 may be externally powered or may be self powered depending upon the requirements or demands of the users.

In FIG. 3A, an externally powered electrical arrangement 200 is illustrated in one form. The externally powered electrical arrangement 200 of this form includes at least one piezoelectric sensor 210, at least one microprocessor 220, at least one piezoelectric actuator 230 and at least one power source arrangement 240. As described above, the electrical arrangement 200 is encapsulated within the covering arrangement 300. The specific placement of each element will be better understood with reference to FIG. 3A.

The piezoelectric sensor 210 is disposed between the inner and outer linings 310, 320 in a hanging manner from end thereof. For example, the piezoelectric sensor 210 may be of longitudinal shape, which from one end thereof may be disposed between the inner and outer linings 310, 320 via a supporter 250 in such a manner that the other end may be capable of oscillating or vibrating up and down, or may be simply capable of moving or vibrating upon sensing one or more variables. Specifically, the piezoelectric sensor 210 is adapted to detect one or more variables and generate a signal based on the detection of the one or more variables. Further, the microprocessor 220 is electrically coupled to the piezoelectric sensor 210 to receive the signal generated by the at least one piezoelectric sensor 210 and to process the signal. Furthermore, the piezoelectric actuator 230 is electrically coupled to the microprocessor 220 to receive the signal processed by the microprocessor 220 and actuate for stabilizing the user's body parts.

Further, the piezoelectric actuator 230 may be encapsulated in the covering arrangement 300 in such a manner that it maintains the proximity to the user body part to increase the responsiveness of one or more variables effect on the user's body parts. For example, the piezoelectric actuator 230 is configured below the outer lining 320. However, without departing from the scope of the present general inventive concept, the piezoelectric actuator 230 may be configured within the protective covering 300 in any manner as best to increase the responsiveness of one or more variables effect on the user's body parts.

Further, the power source arrangement 240 may be coupled to the microprocessor 220 and the piezoelectric actuator 230 to electrically charge these elements. The power source arrangement 240 may include at least one battery 242 and at least one capacitor 244 electrically coupled to the battery 242. The capacitor 244 is capable of being charged by the signal of the piezoelectric sensor 210, thereby in turn charging the battery 242. Such power source arrangement 240 configures the externally powered electrical arrangement 300.

In FIG. 3B, self powered electrical arrangement 200 is illustrated in one form. The self powered electrical arrangement 200 of this form includes at least one piezoelectric sensor 210, at least one microprocessor 220 and at least one piezoelectric actuator 230.

The piezoelectric sensor 210, the microprocessor 220 and the piezoelectric actuator 230 of self powered electrical arrangement 200 are coupled to the covering arrangement 300 in a manner and having a function, as shown and explained in conjunction with in FIG. 3A. However, the self powered electrical arrangement 200, according to this form, may not include any external power source arrangement, such as power source arrangement 240 as described above.

Specifically, the piezoelectric sensor 210 is adapted to detect one or more variables and generate a signal based on the detection of the one or more variables. Further, the microprocessor 220 coupled to the piezoelectric sensor 210 is adapted to receive the signal generated by the piezoelectric sensor 210 and process thereto. Furthermore, the piezoelectric actuator 230 is configured to be actuated by the piezoelectric sensor 210 or by the processed signal received by the microprocessor 220. Moreover, the electrical arrangement 200 as shown in FIG. 3B, also includes at least one capacitor, such as capacitor 242, configured to be charged by the signal of the piezoelectric sensor 210.

The electrical arrangement 200, as shown in FIGS. 3A and 3B are two important exemplary forms, but may not be considered to be a limitation to the present general inventive concept. The electrical arrangements 200 may extend to include any other type of arrangement involving transducers, accelerometer or nay other known electrical or electronic components capable of meeting said purpose. For example, an electrical arrangement, such as the electrical arrangement 200, may include at least one transducer, at least one accelerometer and at least one microprocessor electrically coupled to each other for detecting the one or more variables acting on the user's body parts, and responding in a manner to stabilize thereto. Further, such arrangement may include at least one power source for its intended purpose.

All forms of the electrical arrangement 200, as described above, are capable of stabilizing the user's body parts by at least reducing, increasing and/or maintaining the one or more variables effect on the user's body parts. For example, in order to reduce the one or more variables effect on the user's body parts, the piezoelectric elements, such as the sensor 210 and the actuator 230, vibrate at a reverse frequency as that of source, thereby damping or reducing one or more variables effect on the user's body parts. Further, in order to increase the one or more variables effect on the user's body parts, the piezoelectric elements, such as the sensor 210 and the actuator 230, convert the stored electrical power of the capacitor 242 into mechanical power to decrease flexibility, stiffen or tighten at least a portion of the apparatus 100, thereby increasing one or more variables effect on the user's body parts. Furthermore, in order to maintain the one or more variables effect on the user's body parts, the piezoelectric elements, such as the sensor 210 and the actuator 230, may intermittently convert the stored electrical power of the capacitor 242 into mechanical power and vice versa, for tightening and relaxing the apparatus 100, thereby maintaining one or more variables effect on the user's body parts.

Referring now to FIGS. 4 to 6C, wherein the applicability of the various embodiments of the apparatus 100 are illustrated with respect to various wearable articles.

Figure 4:
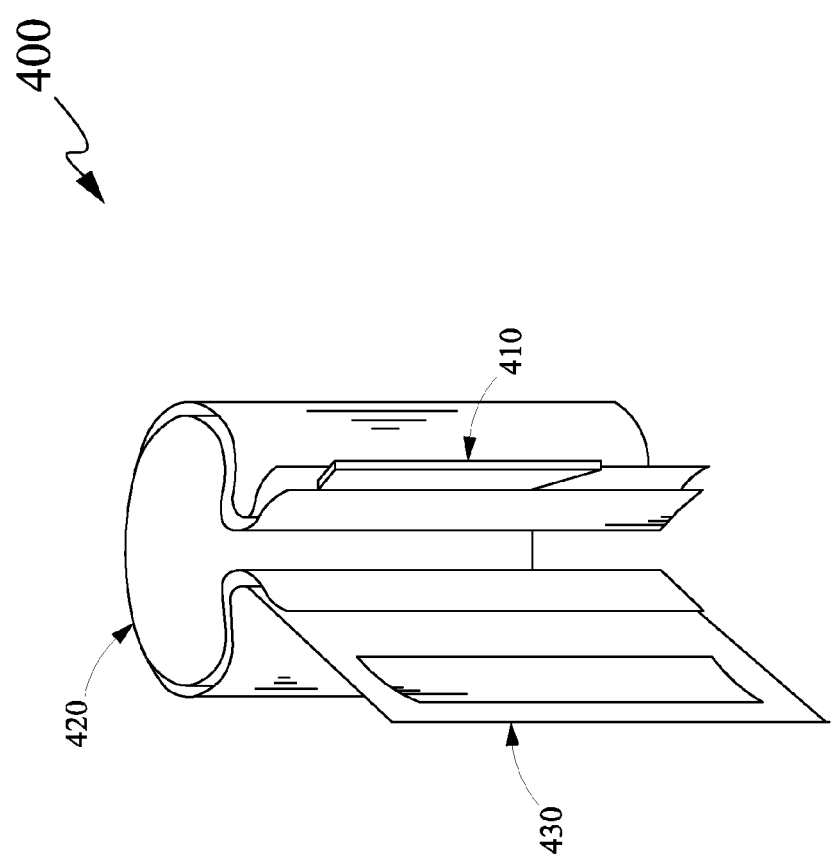
FIG. 4 illustrates a wearable article incorporating the apparatus, in accordance with further exemplary embodiment of the present general inventive concept.

As shown in FIG. 4, a wearable article 400 includes an electrical arrangement 410, a protective covering arrangement 420, and a fastening member 430. The electrical arrangement 410 and the protective covering arrangement 420 are similar to the electrical arrangement 200 and the covering arrangement 300, respectively, in constructional and functionality, and for the sake of brevity excluded from the explanation herein. The fastening member 430 may be secured to configurational arrangement of the electrical arrangement 410 and the protective covering arrangement 420 for obtaining the wearable article 400.

The fastening member 430 may, for example, be Velcro or any other hook and pull fasteners. However, without departing from the scope of the present general inventive concept, the fastening member 430 may be any other kind of fastener for above mentioned intended purpose as know in the art. Such wearable article 400 may be utilized fit its said intended purpose upon being worn on predetermined body part of the user.

Figure 5C:
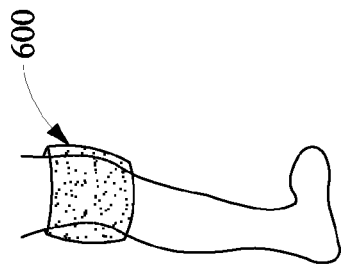
FIGS. 5A to 5E illustrate various views of the wearable article worn by the user at various parts, in accordance with an exemplary embodiment of the present general inventive concept.
Figure 5B:
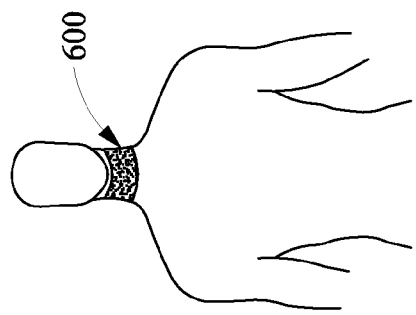
Figure 5A:
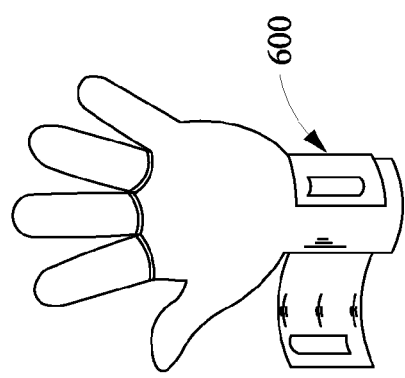
Figure 5E:
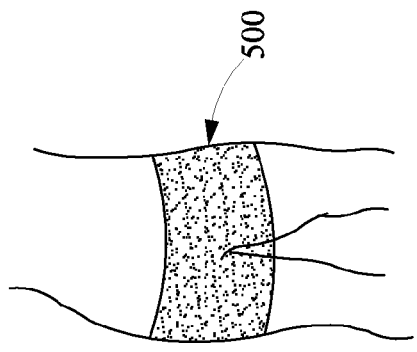
Figure 5D:
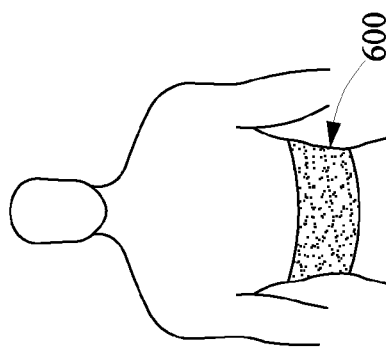

FIGS. 5A to 5E illustrate the wearable article 400 worn on the predetermined body parts of the user. For example, FIG. 5A illustrates the wearable article 400 configured to act as a brace 500 being worn by the user on wrist thereof. FIG. 5B illustrates the wearable article 400 configured to act as a wrap 600 being wrapped by the user around neck thereof. FIG. 5C illustrates the wearable article 400, acting as the wrap 600 being wrapped by the user around his/her knee. FIG. 5D illustrates the wearable article 400, acting as the wrap 600 being wrapped by the user around hip thereof. FIG. 5E illustrates the wearable article 400, acting as the wrap 600 being wrapped by the user around his/her back. However, it should be understood that without departing from the scope of the present general inventive concept, the wrap 600 may be wrapped by the user around any body portion thereof, as desired, and may not considered to be limiting only to illustrated embodiments herein. Such wearable article 400 acting as the brace 500 or the wrap 600, when worn by the user, it stabilizing users predetermined body parts on to which its being warn against vibration, pressure, or any other variables acting on the body weather involved in sports or any other physical activities or when required during sports medication, rehabilitation or in orthopedics.

Figure 6A:
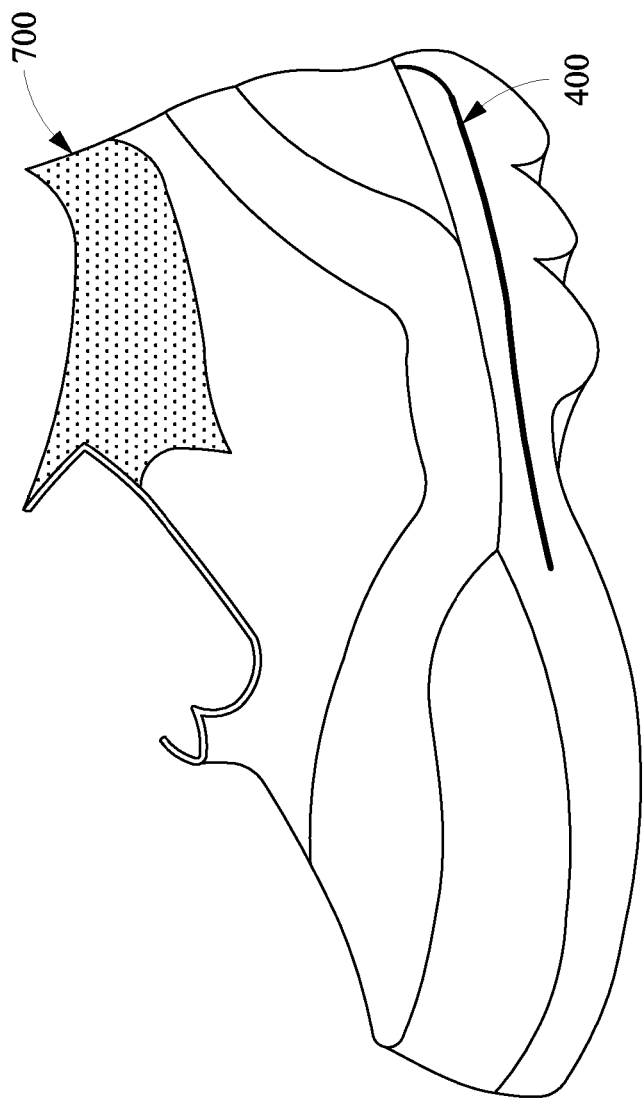
FIGS. 6A to 6C illustrate a wearable article, such as shoe, incorporating the apparatus, in accordance with further exemplary embodiment of the present general inventive concept.
Figure 6B:
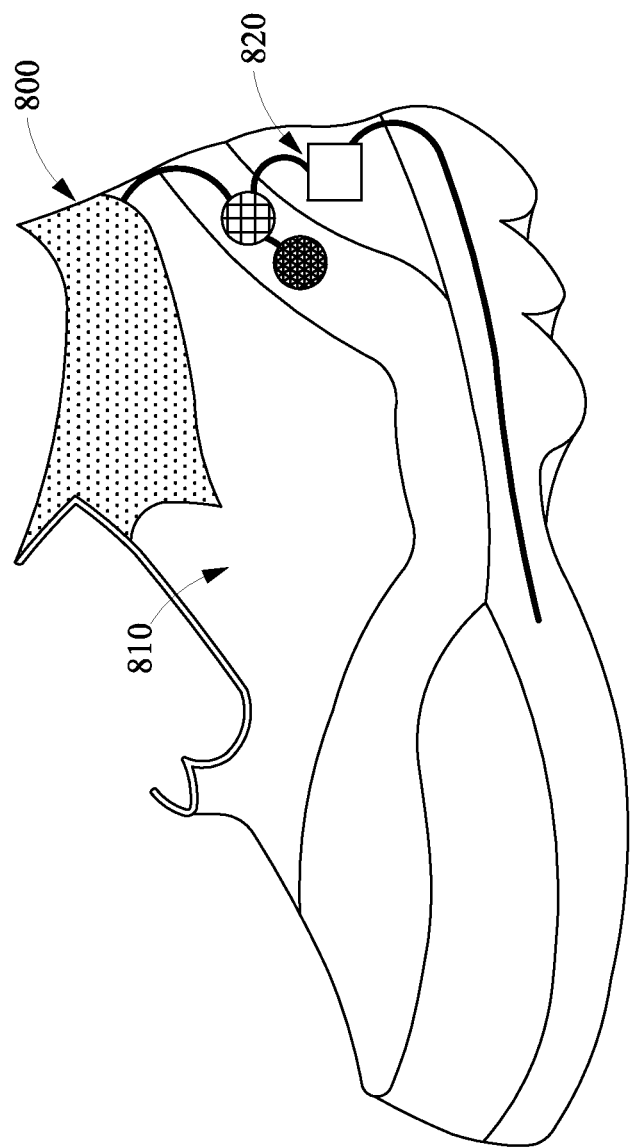
Figure 6C:
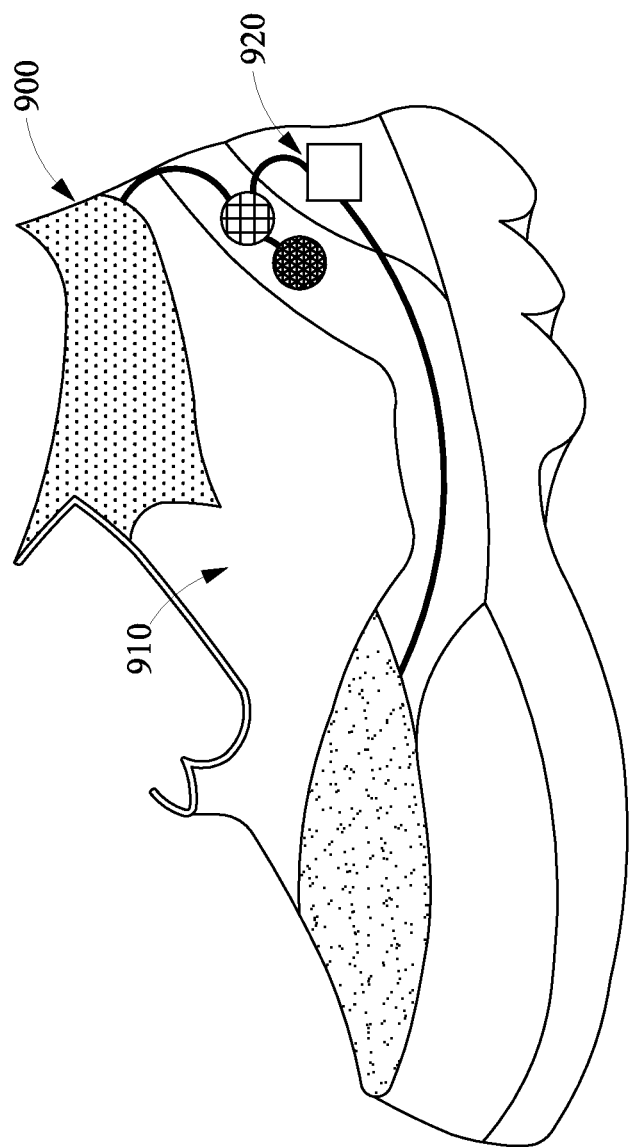

Further, the wearable article 400 may be fastened to another wearable article adapted to be worn by the user. For example, FIGS. 6A to 6C illustrate a wearable article, such as shoe 700, incorporating wearable article 400 having the apparatus 100, in accordance with further exemplary embodiment of the present general inventive concept. Specifically, FIG. 6A illustrates the wearable article 400 being fastened to the shoe 700 that may be worn by the user. In one form, the wearable article 400 may be disposed underneath the sole of the shoe 700 for performing its intended purpose. Such shoe 700, when worn by the user, stabilizes user's leg against vibration, pressure, or any other variables acting on the body, irrespective weather involved in sports or any other physical activities or when required during sports medication, rehabilitation or in orthopedics.

Referring now to FIGS. 6B and 6C, various other forms of the wearable articles, such as shoes 800 and 900 are illustrated, in accordance with further exemplary embodiment of the present general inventive concept. In these embodiments, the wearable articles, such as the shoes 800 and 900, do not include any fastening member, such as the ones disclosed above, but instead the wearable articles, such as the shoes 800 and 900, are configured in the form of apparatus itself and may be capable of stabilizing users leg against vibration, pressure, or any other variables acting on the body weather involved in sports or any other physical activities or when required during sports medication, rehabilitation or in orthopedics. For example, in there embodiments, the shoes' bodies 810 and 910 may act as protective covering arrangement, such as the covering arrangement 300, wherein the electrical arrangements 820, 920, similar to the electrical arrangements 200 as illustrated and described herein above in FIGS. 3A and 3B, are disposed there within.

The electrical arrangement 410 and the protective covering arrangement 420 are similar to the electrical arrangement 200 and the covering arrangement 300, respectively functionally and structurally, and for the sake of brevity excluded from the explanation herein. Specifically, the shoe 800 includes the externally powered electrical arrangement 820, similar to the externally powered electrical arrangement 200 as described in FIG. 3A, thereby configuring the externally powered shoe 800 for stabilizing users leg against vibration, pressure, or any other variables acting on the body weather involved in sports or any other physical activities or when required during sports medication, rehabilitation or in orthopedics upon being worn. Further, the shoe 900 includes the self powered electrical arrangement 920, similar to the externally powered electrical arrangement 200 as described in FIG. 3B, thereby configuring the self powered shoe 800 for stabilizing users leg against vibration, pressure, or any other variables acting on the body weather involved in sports or any other physical activities or when required during sports medication, rehabilitation or in orthopedics upon being worn.

Figure 7:
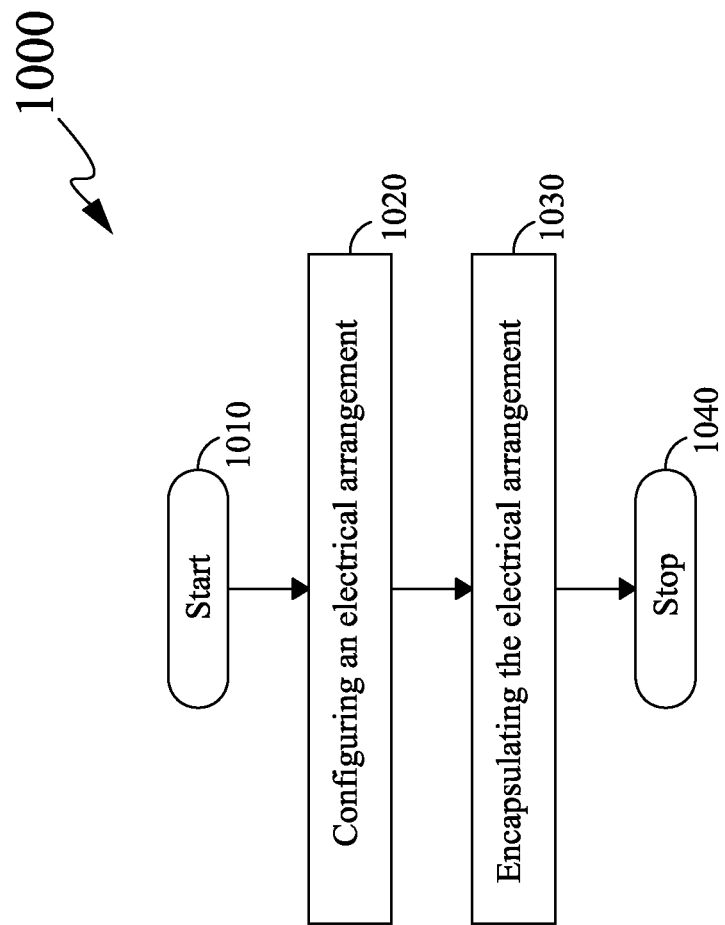
FIG. 7 illustrates a flow diagram depicting method of making the apparatus, in accordance with further exemplary embodiment of the present general inventive concept.

Referring now to FIG. 7, wherein a flow diagram depicting a method 1000 of making the apparatus 100 or wearable articles 800, 900, is illustrated, in accordance with further exemplary embodiment of the present general inventive concept. The method 1000 starts at 1010. Further at 1020, an electrical arrangement, such as the electrical arrangement 200 as explained in FIGS. 3A and 3B, is configured. The electrical arrangement is capable of detecting one or more variables acting on the user's body parts and responding in a manner configured to stabilize the user's body parts. For the sake of the brevity, the repetition of such the electrical arrangement is excluded. Furthermore, at 1030, the electrical arrangement is encapsulated in the protective covering arrangement, such as the covering arrangements 300, 810 and 910, as explained above. For the sake of the brevity, the repetition of such the protective covering arrangement is excluded.

Apparatus 100, wearable articles 400 acting as such as brace 500, wrap 600 shoe 700, 800 or 900 hereafter referred to as "the apparatuses and articles" of the present general inventive concept offer the following advantages. The apparatuses and articles are capable of stabilizing user's body parts against any variables, such as pressure, impact or vibration etc. acting on the body during sports or physical activities, or during sports medication, rehabilitation or in orthopedics. The apparatuses and articles are capable of being worn on any desired body part of the user in order to utilize thereto of maximum benefit there from against any variables acting on the body. Furthermore, the method for making such apparatuses and articles may be economical and convenient, thereby providing cost effective apparatuses and articles for the users The foregoing descriptions of specific embodiments of the present general inventive concept have been presented for purposes of illustration and description. They are not intended to be exhaustive or to limit the present general inventive concept to the precise forms disclosed, and obviously many modifications and variations are possible in light of the above teaching. The embodiments were chosen and described in order to best explain the principles of the present general inventive concept and its practical application, to thereby enable others skilled in the art to best utilize the present general inventive concept and various embodiments with various modifications as are suited to the particular use contemplated. It is understood that various omission and substitutions of equivalents are contemplated as circumstance may suggest or render expedient, but such are intended to cover the application or implementation without departing from the spirit or scope of the claims of the present general inventive concept

What is claimed is:

1. An apparatus to stabilize a body part of a user, the apparatus comprising:
   an electrical arrangement (i) to detect at least one variable acting on the body part, (ii) to respond in a manner to stabilize the body part, and (iii) to stabilize the body part by (a) maintaining an effect of the at least one variable acting on the body part, or (b) increasing the effect of the at least one variable acting on the body part, and
   wherein the at least one variable acting on the body part includes pressure, and
   wherein a protective covering arrangement including at least one substantially flexible lining encapsulates the electrical arrangement and is attached to or forms at least a portion of a wearable article to be worn by the user.

2. The apparatus as claimed in claim 1, further comprising:
   at least one piezoelectric sensor to detect the at least one variable and generate a signal based on the detection of the at least one variable;
   at least one microprocessor coupled to the piezoelectric sensor to receive the signal generated by the at least one piezoelectric sensor and process the signal;
   at least one piezoelectric actuator coupled to the microprocessor to receive the signal processed by the at least one microprocessor and actuate for stabilizing the body part; and
   at least one power source coupled to the microprocessor and the piezoelectric actuator to electrically charge the microprocessor and the piezoelectric actuator,
   wherein the electrical arrangement is substantially externally powered.

3. The apparatus as claimed in claim 2, wherein the at least one power source includes at least one battery and at least one capacitor.

4. The apparatus as claimed in claim 1, further comprising:
at least one piezoelectric sensor to detect one or more variables and generate a signal based on the detection of the one or more variables;
at least one microprocessor coupled to the piezoelectric sensor to receive the signal generated by the at least one piezoelectric sensor and process the signal; and
at least one piezoelectric actuator to be actuated by at least one of the piezoelectric sensor or the processed signal received by the microprocessor for stabilizing the body part,
wherein the electrical arrangement is substantially self powered.

5. The apparatus as claimed in claim 4, wherein the electrical arrangement includes at least one capacitor to be charged by the signal.

6. The apparatus as claimed in claim 1, wherein the electrical arrangement includes at least one transducer, at least one accelerometer, and at least one microprocessor electrically coupled to each other to detect the at least one variable acting on the body part, and generate a response to stabilize the body part.

7. The apparatus as claimed in claim 6, wherein the electrical arrangement further comprises at least one power source.

8. The apparatus as claimed in claim 1, wherein the protective covering includes at least two substantially flexible linings spaced apart by at least one spacer member that defines a space to encapsulate the electrical arrangement.

9. The apparatus as claimed in claim 1, wherein the protective covering includes at least two substantially flexible linings to encapsulate the electrical arrangement.

10. A method to stabilize a body part of a user via an apparatus, the method comprising:
configuring an electrical arrangement; and
detecting at least one variable acting on a body part via the electrical arrangement; and
generating a response to stabilize the body part upon detection of the at least one variable acting on the body part by (a) maintaining an effect of the at least one variable acting on the body part, or (b) increasing the effect of the at least one variable acting on the body part, and
wherein the at least one variable acting on the body part includes pressure, and
encapsulating the electrical arrangement with a protective covering arrangement including at least one substantially flexible lining, the encapsulated electrical arrangement being attached to or forming at least a portion of a wearable article to be worn by the user.

11. The method as claimed in claim 10, wherein the step of configuring the electrical arrangement includes configuring at least one piezoelectric sensor, at least one microprocessor, and at least one piezoelectric actuator.

12. The method as claimed in claim 11, wherein the step of configuring the electrical arrangement includes configuring at least one power source arrangement.

13. The method as claimed in claim 11, wherein the step of configuring the electrical arrangement includes configuring at least one capacitor.

14. The method as claimed in claim 10, wherein the step of configuring the electrical arrangement includes electrically coupling at least one transducer, at, least one accelerometer, at least one microprocessor, and at least one power source to each other to detect the at least one variable acting on the body part, and to generate a response operable to stabilize the body part.

15. The method as claimed in claim 10, wherein the step of encapsulating the electrical arrangement with a protecting covering arrangement includes disposing the electrical arrangement between at least two substantially flexible linings spaced apart by at least one spacer member.

16. A wearable article to be worn by a user to stabilize at least one body part of the user, the wearable article comprising:
an electrical arrangement to detect at least one variable acting on the at least one body part and generate a response to stabilize the at least one body part by (a) maintaining an effect of the at least one variable acting on the at least one body part, or (b) increasing the effect of the at least one variable acting on the at least one body part; and
wherein the at least one variable acting on the at least one body part includes pressure; and
a protective covering including at least one flexible lining substantially encapsulating the electrical arrangement and attached to or forming at least a portion of a wearable article to be worn by the user; and
a fastening member secured to the protective covering.

17. The wearable article as claimed in claim 16, wherein the fastening member is configured to fasten the wearable article on the at least one body part.

* * * * *